United States Patent
Schreiner et al.

(10) Patent No.: US 12,105,541 B2
(45) Date of Patent: Oct. 1, 2024

(54) WATER SUPPLY SYSTEM FOR AN AIRCRAFT

(71) Applicant: Airbus Operations GmbH, Hamburg (DE)

(72) Inventors: Axel Schreiner, Bremen (DE); Michael Rempe, Hamburg (DE); Tim Lübbert, Wedel (DE)

(73) Assignee: Airbus Operations GmbH, Hamburg (DE)

( * ) Notice: Subject to any disclaimer, the term of this patent is extended or adjusted under 35 U.S.C. 154(b) by 355 days.

(21) Appl. No.: 17/726,881

(22) Filed: Apr. 22, 2022

(65) Prior Publication Data

US 2022/0342431 A1 Oct. 27, 2022

(30) Foreign Application Priority Data

Apr. 23, 2021 (EP) ..................................... 21170133

(51) Int. Cl.
  *G05D 7/06* (2006.01)
  *B64D 11/02* (2006.01)
  *B64D 11/04* (2006.01)

(52) U.S. Cl.
  CPC ........... *G05D 7/0623* (2013.01); *B64D 11/02* (2013.01); *B64D 11/04* (2013.01); *G05D 7/0652* (2013.01)

(58) Field of Classification Search
  CPC .................................................. G05D 7/0623
  See application file for complete search history.

(56) References Cited

U.S. PATENT DOCUMENTS

| | | | | |
|---|---|---|---|---|
| 5,322,244 A | * | 6/1994 | Dallmann | .......... B64D 11/0007 244/118.1 |
| 2005/0109763 A1 | | 5/2005 | Lee et al. | |
| 2005/0126927 A1 | * | 6/2005 | Lindauer | ............... B64D 11/02 205/743 |

(Continued)

FOREIGN PATENT DOCUMENTS

| | | | | |
|---|---|---|---|---|
| DE | 42 02719 A1 | | 8/1993 | |
| DE | 10308498 A1 | * | 9/2004 | ............. B64D 11/02 |

(Continued)

OTHER PUBLICATIONS

European Search Report for Application 21170133 dated Sep. 30, 2021.

*Primary Examiner* — Suresh Suryawanshi
(74) *Attorney, Agent, or Firm* — KDW Firm PLLC

(57) ABSTRACT

A water supply system for an aircraft having consumers with buffer stores connected to a water tank by lines and a pressure source. Each consumer has a filling valve between the buffer store and the pressure source. The buffer store can be filled by opening the filling valve. In each consumer, water can be removed from the buffer store by opening a consumer valve. Each consumer transmits at least one state parameter describing a state of the buffer store of the respective consumer to a control system. The control system controls opening and closing of the filling valves of the consumers taking into account the transmitted state parameters such that removal of water from the water tank by the pressure source does not exceed a threshold value at any point in time. An aircraft having a water supply system and method for controlling a water supply system are disclosed.

15 Claims, 3 Drawing Sheets

(56) References Cited

U.S. PATENT DOCUMENTS

| | | | |
|---|---|---|---|
| 2008/0191094 A1* | 8/2008 | Heinrich | B64D 11/02 244/118.5 |
| 2017/0320575 A1* | 11/2017 | Oguri | E03B 11/06 |
| 2018/0044023 A1* | 2/2018 | Nojiri | B64D 11/04 |
| 2018/0291595 A1* | 10/2018 | Lubbert | E03B 7/04 |
| 2019/0063046 A1* | 2/2019 | Alps | C02F 5/08 |

FOREIGN PATENT DOCUMENTS

| | | | |
|---|---|---|---|
| DE | 102014015991 A1 * | 4/2016 | B64D 11/02 |
| EP | 3 385 163 A1 | 10/2018 | |

\* cited by examiner

WATER SUPPLY SYSTEM FOR AN AIRCRAFT

CROSS-REFERENCE TO RELATED APPLICATION

This application claims priority to European Patent Application No. 21170133.9 filed Apr. 23, 2021, the entire disclosure of which is incorporated by reference herein.

TECHNICAL FIELD

The disclosure herein relates to a water supply system for an aircraft, to an aircraft having such a water supply system, and to a method for controlling a water supply system in an aircraft.

BACKGROUND

EP 3 385 163 A1 discloses an aircraft having a drinking water supply system, in which multiple consumer units are connected to a water tank by way of a line system and at least one pressure generator. At least certain portions of the lines of the line system have an internal diameter of less than 8 mm, with the result that, to supply the consumer units with enough drinking water, a pressure of for example 50 bar or more is built up in the lines by the pressure generator. In order to lower the pressure of the water to a consumer water pressure before it is dispensed to the consumer units, pressure reducers arranged between the pressure generator and one or more consumer units or consumers are provided. The pressure reducers may also comprise buffer stores.

In the drinking water supply system known from EP 3 385 163 A1, by contrast to the prior art it is possible to use flexible plastic hoses as lines of the line system. These not only can be laid more flexibly than the rest of the rigid pipelines elsewhere, and therefore facilitate the planning and installation of the line system, but are also considerably lighter and, by contrast to conventional pipelines, do not have to be heated. The latter in particular is a considerable advantage, since the weight reductions achieve savings in the fuel consumption of the aircraft and therefore lower operating costs.

SUMMARY

Against this background, a person skilled in the art is faced with the problem of providing a lightweight and compact water supply system for an aircraft. Furthermore, a person skilled in the art is faced with the problem of specifying a method for operating a water supply system that makes it possible to design the water supply system as particularly lightweight and compact.

This problem is solved by a water supply system and method disclosed herein.

In a first aspect, the disclosure herein relates to a water supply system for an aircraft, having a water tank, a pressure source and a plurality of consumers with buffer stores. The plurality of consumers with buffer stores is connected to the water tank by way of lines and the pressure source. Each consumer of the plurality of consumers with buffer stores has a buffer store for water, a filling valve and a consumer valve. In each consumer of the plurality of consumers with buffer stores, the filling valve is arranged between the respective buffer store and the pressure source and is configured such that the respective buffer store can be filled by opening the filling valve. The consumer valve is arranged and configured such that water can be removed from the buffer store by opening the consumer valve. Each consumer with a buffer store is configured to transmit at least one state parameter describing a state of the buffer store of the respective consumer to a control system of the water supply system. The control system is configured to control the opening and closing of the filling valves of the consumers with buffer stores by taking into account the transmitted state parameters in such a way that the removal of water from the water tank by the pressure source does not exceed a threshold value at any point in time.

In other words, what is provided is a system with which a plurality of consumers with buffer stores in an aircraft can be supplied with water and preferably with drinking water from a water tank. In one example embodiment, the system may also comprise a plurality of consumers without buffer stores. The consumers may for example be washrooms, in which it is necessary to supply both a tap of a washbasin and the flush system of a WC with water. Another consumer would be a tap in an aircraft kitchen or galley.

The consumers are connected to the water tank by way of one or more lines, which together can be referred to as a line system. The lines may for example be flexible plastic lines with an internal diameter of less than 8 mm. Water is removed from the water tank by a pressure source or pump, which pumps the water through the lines to the consumers. On account of the small internal diameter of the lines, in this case the pressure source must be able to generate a water pressure of 10 bar or more, preferably 20 bar or more, and even more preferably 50 bar or more, in order to supply the consumer with enough water. It is therefore a high-pressure pump.

Each consumer of the plurality of consumers with buffer stores comprises at least one buffer store and also a filling valve and a consumer valve. The filling valve is arranged between the buffer store and the pressure source and can be opened in order to fill the buffer store with water from the water tank. In order to remove water from the buffer store, the consumer valve is provided. A consumer valve could be arranged for example in a washroom between a buffer store and a tap or a WC bowl. If a user actuates a pushbutton, in order for example to make a request for water for washing from the tap or for flushing the WC bowl, the consumer valve opens and removes water from the buffer store. A buffer store may also be equipped with more than one consumer valve. For example, the buffer store may supply both a WC flushing system and also a tap in a washroom, which in this case therefore both remove water from the buffer store.

The buffer store can store water for example at a low supply pressure of between 2 bar and 6 bar, or as an alternative store it without pressure, i.e. at ambient pressure. In the latter case, for example, a pump which removes water from the buffer store could be arranged in the buffer store.

Each of the consumers with a buffer store is configured to transmit one or more state parameters relating to the state of the buffer store to a control system of the water supply system. This transmission can take place by wire or wirelessly. For example, the consumer can output the state parameter(s) at regular intervals, i.e. continuously, on a wired bus, such as an ethernet network, for example, a CAN bus or an ARINC bus. As an alternative, the consumer can also transmit the state parameter whenever the state parameter(s) change(s). It is also conceivable that the control system requests the state parameters and they are thereupon transmitted by the consumer. Examples of state parameters are specified in the preferred embodiments.

The control system is configured to control the opening and closing of the filling valves on the basis of the state parameters transmitted by the individual consumers. In other words, the control system can change the degree of opening of the filling valves, that is to say for example bring a filling valve into an open position, with the result that the subsequent buffer store can be filled, or brought into a closed position, with the result that the buffer store is separated from the lines connecting the consumer to the water tank. To control the filling valves, the control system is connected to the individual filling valves via a data connection, which likewise can be wireless or wired. The connection may be performed, for example, such that the control system directly actuates each filling valve or that the control system issues control commands to a local control unit of the consumer which in turn assumes actual control of the filling valves. Other configurations also possible, but are not described in more detail here.

The filling valves are controlled with the aim of keeping the entire amount of water that has to be provided at any point in time by the pressure source below a predetermined threshold value. This threshold value may be selected for example such that at any point in time, only the buffer store of one consumer of the plurality of consumers can be filled with water. However, it is also conceivable that two buffer stores can be filled with water at the same time. In any case, however, the threshold value is selected such that only a fraction of the buffer stores connected to the water tank by way of the same pressure source can be filled at the same time. For example, only one of four buffer stores or one of eight buffer stores can be filled at the same time.

The actual logic of the control system, which makes a decision as to whether to open the filling valves of the consumers with buffer stores at least taking into account the transmitted state parameters, may for example be a fixedly predetermined logic which makes a decision as to the time at which each filling valve opens in accordance with predefined rules. However, it is also conceivable to use a self-learning logic, which constantly makes a new decision as to which filling valve is to be opened at which time on the basis of recorded data, in order to allow an as small as possible simultaneous removal of water from the water tank by the pressure source.

Restricting the amount of water removed from the water store by the pressure source at the same time, that is to say restricting the take-up of water, makes it possible to minimize the dimensions, the weight and the power consumption of the pressure source or pump. A compact and lightweight pressure source is fundamentally advantageous in the aircraft sector, since the weight which is saved makes it possible to lower the operating costs of the aircraft. If the pump has to be configured such that it can supply all of the consumers in an aircraft at the same time with water, it would need very large and heavy dimensions on account of the high water pressure required in the lines. A correspondingly lower-power pump additionally creates significantly less noise and vibrations, this being of great advantage in particular in a passenger aircraft.

In a preferred embodiment, the control system is configured to control the opening and closing of the filling valves of consumers with buffer stores connected to the water tank via the pressure source such that at no point in time is more than a predetermined number of filling valves open that is smaller than the number of the plurality of consumers. More preferably, the control system is configured such that at no point in time is more than a single filling valve open. Opening merely a fixed number of filling valves to the maximum extent and preferably always opening only one filling valve at the same time constitutes an especially reliable procedure, in order to restrict the maximum removal of water from the water tank by the pressure source.

In a preferred embodiment, the at least one state parameter is selected from among a fill state of the buffer store, a pressure of the water in the buffer store, and a request for opening of the consumer valve. It is further preferable if all three state parameters are transmitted to the control system. To detect the fill state of the buffer store and the water pressure in the buffer store, it is possible for example to install sensors in the buffer store which detect the corresponding parameters and—directly or indirectly—transmit them to the control system. A request for opening of the consumer valve corresponds for example to the actuation of a pushbutton in a washroom of the aircraft, which triggers the flushing of the WC or requests water for washing. On the basis of all three parameters, the control system can identify the extent to which it is necessary to fill the respective buffer store with water and thus to make a decision as to which buffer store is filled at which point in time.

For example, the control system can identify that the fill state of a buffer store in a washroom is only sufficient for one further actuation of a tap, but no longer for actuation of the flush system of the WC, whereas in another washroom of the aircraft there is still water available in the buffer store for actuation of the flush system of the WC and further actuations of the tap. In this case, the control system can first of all fill the buffer store of the first washroom by opening the corresponding filling valve, and then open the filling valve of the second washroom. Actuating a flush system or a tap is understood here to mean the request for opening of the consumer valve connected to the flush system or the tap, respectively, and a washroom could constitute a respective consumer, for example.

As an alternative or in addition, it is preferred that the state parameter is a description of the state of the buffer store. For example, the description of the state could consist of an indication as to how often a consumer valve can still be actuated before the buffer store of the respective consumer is empty. In this way, the state parameter of a buffer store connected to a tap in an aircraft kitchen could for example report that the content of the buffer store is still enough for three openings of the consumer valve. On the basis of this state parameter, the control system can make a decision as to the sequence in which the filling valves are opened, with the result that the threshold value for the removal of water is not exceeded, while the uniform and timely supply of the consumer with water is enabled. The description of the state may be determined for example by measuring the fill state and the pressure in the buffer store. However, it is also conceivable that the description of the state is determined by having the consumer keep count of how often the consumer valve has been opened since the buffer store was last filled.

In addition, the control system may preferably also take into account further parameters or criteria when deciding at which point in time which filling valve is opened. For example, it is possible to assign different priorities to different consumers. In this way, it would be possible to assign a higher priority to a galley than to a washroom in business class, which in turn has higher priority than a washroom in economy.

Furthermore, the control system could take into account the frequency with which the opening of the consumer valve(s) of a consumer is requested. A higher frequency could mean that the consumer is also used more frequently in the future and therefore should be filled more quickly.

In a preferred embodiment, the control system is formed by a central control unit, which is configured to control the opening and closing of the filling valves of the consumers with buffer stores. Such a central control unit, which could be integrated for example in the rest of the cabin control system of an aircraft cabin, would make a decision centrally as to the opening and closing of each filling valve.

As an alternative or in addition, the control system comprises a plurality of independent control units, wherein each independent control unit is assigned a consumer with a buffer store, wherein each independent control unit has available to it the state parameters which are transmitted to the control system by the consumers and taking account of which the control system controls the removal of water from the water tank by the pressure source, and wherein each independent control unit is configured to control the filling valve of the consumer to which it is assigned.

In other words, in the preferred embodiment it is provided that the control system comprises a plurality of independent control units, each of which is assigned a consumer with a buffer store. Over all of the consumers, each of the independent or stand-alone control units has available the same state parameters on the basis of which a decision is made as to which filling valve is opened and closed at what time. In addition, the same logic is implemented in all of the control units, on the basis of which the decision to open and close the filling valves is made. In this way, each control unit can determine at any point in time which filling valve is currently to be opened or to be closed, without a central control unit being necessary for this purpose. This has the advantage in particular that even if independent control units fail, the rest of the control units remain functional. In other words, when one control unit fails, the failure also always affects only the consumer to which the failed control unit is assigned. All other consumers can continue to be operated, since they are controlled independently.

In a preferred embodiment, the control system is configured to control the opening and closing of the consumer valve of at least one consumer of the plurality of consumers. In other words, in the preferred embodiment the control system can control not only the filling valve of a consumer but also the consumer valve of the consumer.

In the case of at least one consumer of the plurality of consumers with buffer stores the consumer valve of which can be controlled by the control system and which is configured to transmit a request for opening the consumer valve to the control system as a state parameter, the control of the consumer valve is preferably used to delay a point in time at which the consumer valve is opened until a user requests that the consumer valve is opened, with the result that it is possible to delay the filling of the buffer store. The control system thus not only intervenes in the filling of the buffer store by controlling the opening and closing of the filling valve, but also controls the opening of the consumer valve when a user requests that it is opened. In this way, when a buffer store of a washroom has a low fill state, the opening of the consumer valve of the WC flush system can be delayed, for example, so that there is still enough water available for washing the hands.

In addition to the consumers with buffer stores already described, an example water supply system may also comprise consumers comprising no buffer stores. Consumers of this type comprise merely a consumer valve and a pressure reducer, which is arranged between the consumer valve and the pressure source. It is conceivable for example for consumers of this type without a buffer store to transmit a request to open the consumer valve to the control system and for the control system to control the opening of the consumer valve such that the removal of water from the water tank by the pressure source does not exceed a threshold value at any point in time. For this purpose, for example, it is possible to delay the opening of the consumer valve until the requested filling of a buffer store of another consumer is finished.

However, the control of the consumer valves can also be used in order for example on the approach to landing or during the flight to automatically discharge water from the aircraft and thus reduce the landing weight of the aircraft.

It is further preferable if the control system is configured to receive flight data from an aircraft system and to take into account the received flight data when controlling the filling valves and or the consumer valves of the consumers. The flight data may comprise for example the occupancy rate of the aircraft, also subdivided according to booking classes, the status of a washroom (occupied or unoccupied), the flight phase, such as take-off, landing, cruise or rolling, for example, the boarding time, the planned provisioning of the passengers or information relating to the cabin layout, all of which can be taken into account when the filling valves are being controlled in order to allow the buffer stores to be filled as optimally as possible.

In an example preferred embodiment, it is provided that each consumer can open and close its own filling valve also independently of the control system, in order to ensure that the consumer functions even in the event of failure of the control system.

In a second aspect, the disclosure herein relates to an aircraft having a water supply system according to one of the embodiments described above. The advantages of the aircraft correspond to the advantages of the water supply system used therein.

In a third aspect, the disclosure herein relates to a method for controlling a water supply system for an aircraft, having a water tank, a pressure source and a plurality of consumers with buffer stores, wherein the plurality of consumers with buffer stores is connected to the water tank by way of lines and the pressure source, wherein each consumer has a buffer store for water, a filling valve and a consumer valve, wherein, in each consumer of the plurality of consumers with buffer stores, the filling valve is arranged between the respective buffer store and the pressure source and is configured such that the respective buffer store can be filled by opening the filling valve, and the consumer valve is arranged and configured such that water can be removed from the buffer store by opening the consumer valve, wherein each consumer with a buffer store is configured to transmit at least one state parameter describing a state of the buffer store of the respective consumer to a control system of the water supply system, and wherein the control system is configured to control the opening and closing of the filling valves of the consumers by taking into account the transmitted state parameters in such a way that the removal of water from the water tank by the pressure source does not exceed a threshold value at any point in time.

The opening and closing of the filling valves of consumers with buffer stores connected to the water tank by way of the pressure source is preferably controlled such that at no point in time is more than a predetermined number of filling valves open that is smaller than the number of the plurality of consumers with buffer stores and the predetermined number is preferably one.

The at least one state parameter is preferably selected from a fill state of the buffer store, a pressure of the water in the buffer store and a request for the opening of the consumer valve. Further preferably, each consumer transmits all three state parameters to the control system. As an alternative or in addition, the at least one state parameter is a description of the state of the buffer store.

The control system is preferably formed by a central control unit which controls the opening and closing of the filling valves of the consumers with buffer stores. As an alternative, the control system comprises a plurality of independent control units, wherein each independent control unit is assigned a consumer with a buffer store, wherein each independent control unit has available to it the state parameters which are transmitted to the control system by the consumers and taking account of which the control system controls the removal of water from the water tank by the pressure source, and wherein each independent control unit controls the filling valve of the consumer to which it is assigned.

The opening and closing of the consumer valve of at least one consumer of the plurality of consumers with buffer stores is preferably controlled by the control system. At least one consumer of the plurality of consumers with buffer stores, the consumer valve of which can be controlled by the control system, transmits a request for opening the consumer valve to the control system as state parameter, and the control system delays a point in time at which the consumer valve is opened until a user requests that the consumer valve is opened, with the result that it is possible to delay the filling of the buffer store.

The advantages of the method correspond to the advantages of the respective water supply system having device features that correspond to the respective method features. The example configurations described above of the water supply system are transferable to the method.

BRIEF DESCRIPTION OF THE DRAWINGS

Example embodiments of a water supply system and an example embodiment of an aircraft having a water supply system and example embodiments of a method are described below with reference to the drawings, in which.

DETAILED DESCRIPTION

Figure 1:
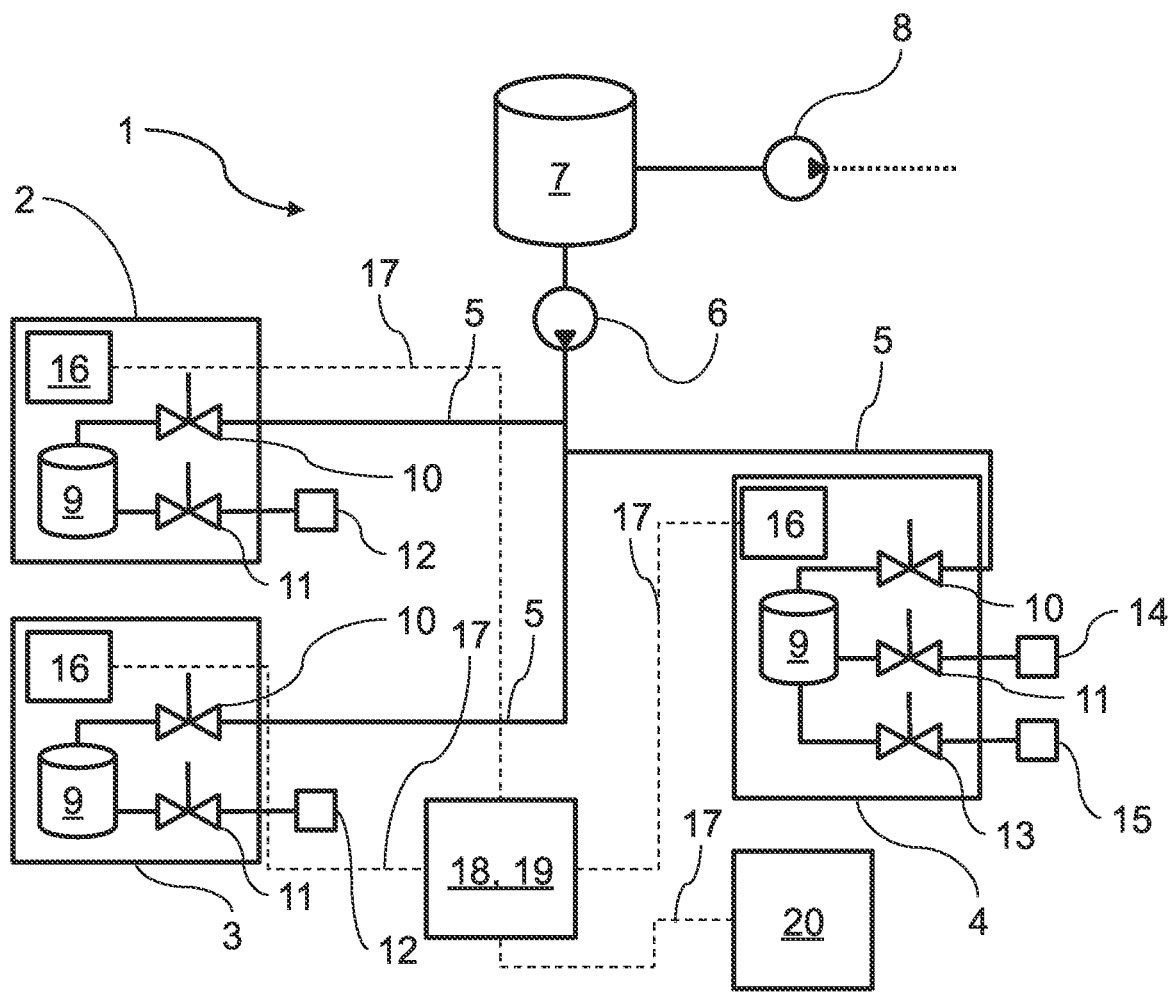
FIG. 1 shows a first example embodiment of a water supply system.

In the following text, first of all a first example of a water supply system 1 for an aircraft and a method for operating such a water supply system are described with reference to FIG. 1. The water supply system 1 comprises a plurality of consumers 2, 3, 4 with buffer stores 9, which are connected to a fresh water tank 7, also referred to in brief as water tank, by way of lines 5 and a pressure source 6 in the form of a high-pressure pump. The consumers 2 and 3 are taps in a galley or aircraft kitchen. The consumer 4 is a washroom of the aircraft.

Further consumers, which are however not illustrated in FIG. 1, may be connected to the water tank 7 by way of the pressure source 6. In particular, these can also be consumers of the type that does not comprise a buffer store. Moreover, additional consumers, which are however likewise not illustrated in FIG. 1, are connected to the water tank by way of a further pressure source 8.

The lines 5 are flexible plastic lines with an internal diameter of less than 8 mm. In order to transport sufficient amounts of water from the water tank 7 to the consumers 2, 3, 4 in a sufficiently short time, the pressure source applies a pressure of more than 10 bar to the water removed from the water tank 7. Therefore, each of the consumers 2, 3, 4 comprises its own buffer store 9, in which water is temporarily stored at a lower consumer pressure of 2 to 6 bar. In addition, each consumer 2, 3, 4 comprises a filling valve 10, which can control the filling of the buffer store 9.

In addition, each consumer 2, 3, 4 comprises at least one consumer valve 11, by way of which the water can be removed from the respective buffer store 9. The first two consumers 2, 3 respectively comprise just one consumer valve 11, which is connected in each case to a tap 12. When requested by a user, the consumer valve 11 of the consumers 2, 3 opens and a defined amount of water is removed from the buffer store 9. The third consumer 4 comprises two consumer valves 11, 13, each of which makes it possible to remove water from the buffer store 9. The first consumer valve 11 is provided to supply water to a flush system 14 of a WC, whereas the second consumer valve 13 is provided to supply water to a tap 15 in a washbasin.

Each consumer 2, 3, 4 also has a data processing unit 16, which data processing units are connected by way of the data lines 17 to a control system 18, which is formed by a central control unit 19 in the example embodiment illustrated in FIG. 1. The data processing units 16 are connected to sensors (not illustrated) on the buffer stores 9, which detect a pressure in the buffer store 9 and the fill level or the fill state of the buffer store 9 and transmit the measured values to the data processing unit 16. Furthermore, each data processing unit 16 is respectively connected to the filling valve 10 and the consumer valve(s) 11, 13 of the associated consumer and can control the opening and closing of the valves 10, 11, 13. The connections of the data processing unit within the consumers 2, 3, 4, which may be wireless or wired, are not illustrated in order to not overload the drawing.

Pushbuttons, which make it possible for a user to request the output of water at the taps 12, 15 or through the flush system 14, are likewise not separately illustrated. Each pushbutton is connected to the data processing unit 16 of the respective consumer 2, 3, 4. If a pushbutton is actuated, the pushbutton transmits a corresponding request for dispensing water to the local data processing unit 16, which can thereupon open the corresponding consumer valve 11, 13.

Each of the data processing units 16 transmits state parameters which characterize the state of the buffer store 9 to the control system 18. The state parameters comprise the fill state of the buffer store 9, the pressure in the buffer store, and requests for opening consumer valves. The control system 18 ascertains or calculates which filling valve 10 to open at what point in time in order to refill the respective buffer store 9 on the basis of these state parameters. In the process, the control system 18 always opens for example only one filling valve at the same time, with the result that the removal of water from the water tank 7 by the high-pressure pump 6 is limited to the maximum amount which can be removed by one of the filling valves 10.

In this way, it is ensured that the high-pressure pump or pressure source 6 at most has to generate a predefined and significantly restricted power. As a result, the pump 6 can have a small and compact form in comparison with a pump which has to be able to fill the buffer stores 9 of all consumers 2, 3, 4 at the same time. A pump 6 with correspondingly smaller dimensions also consumes less power and creates less noise.

In addition to those state parameters that are transmitted by the data processing units 16 of the consumers 2, 3, 4 and obtained or received by the control system 18, the control system 18 takes into account a prioritization of the consumers 2, 3, 4. Thus, in the example illustrated in FIG. 1, the consumers 2 and 3, which are taps in on-board kitchens, have a higher priority than the washroom 4. Furthermore, the control system 18 receives information about the passenger occupancy of the vehicle as a whole and in the individual classes specifically from an on-board computer 20 of the aircraft by way of a data line 17. The data line 17 may also be wireless or wired. The control system 18 may thus take into account for example that the consumers 2, 3, 4 have different frequencies of demand depending on the passenger occupancy of the aircraft and of the individual classes. Information about the flight phase is also transmitted from the on-board computer 20 to the control system 1 and can be taken into account when optimizing the filling of the individual buffer stores 9.

In addition, when there is a request to open a consumer valve 13, 15, the control system 18 may also instruct each data processing unit 16 in one of the consumers 2, 3, 4 to delay the opening. For example, when the buffer store 9 in the consumer 4 which is a washroom has a low fill level, the opening of the consumer valve 11 assigned to the flush system 14 can be delayed in order to ensure that enough water is provided for the tap 15.

In this respect, the control system 18 may therefore also be used to control the opening and closing of the consumer valves 11, 13. In addition to the already described delay of the opening of the consumer valves 11, 13 in order to hold water available in the buffer store 9 for other uses, the opening of the consumer valves may also serve to empty the water supply system. For example, consumer valves 11, 13 connected to taps 12, 15 with drainages that are guided to the outside can be used for this. In this way, for example, excess water can be discharged in flight in order to reduce the weight of the aircraft.

Finally, the data processing units 16 of the consumers 2, 3, 4 can also open all of the valves 10, 11, 13 independently of the control system 18. This ensures that the consumers 2, 3, 4 can be used even in the event of failure of the control system 18.

Figure 2:
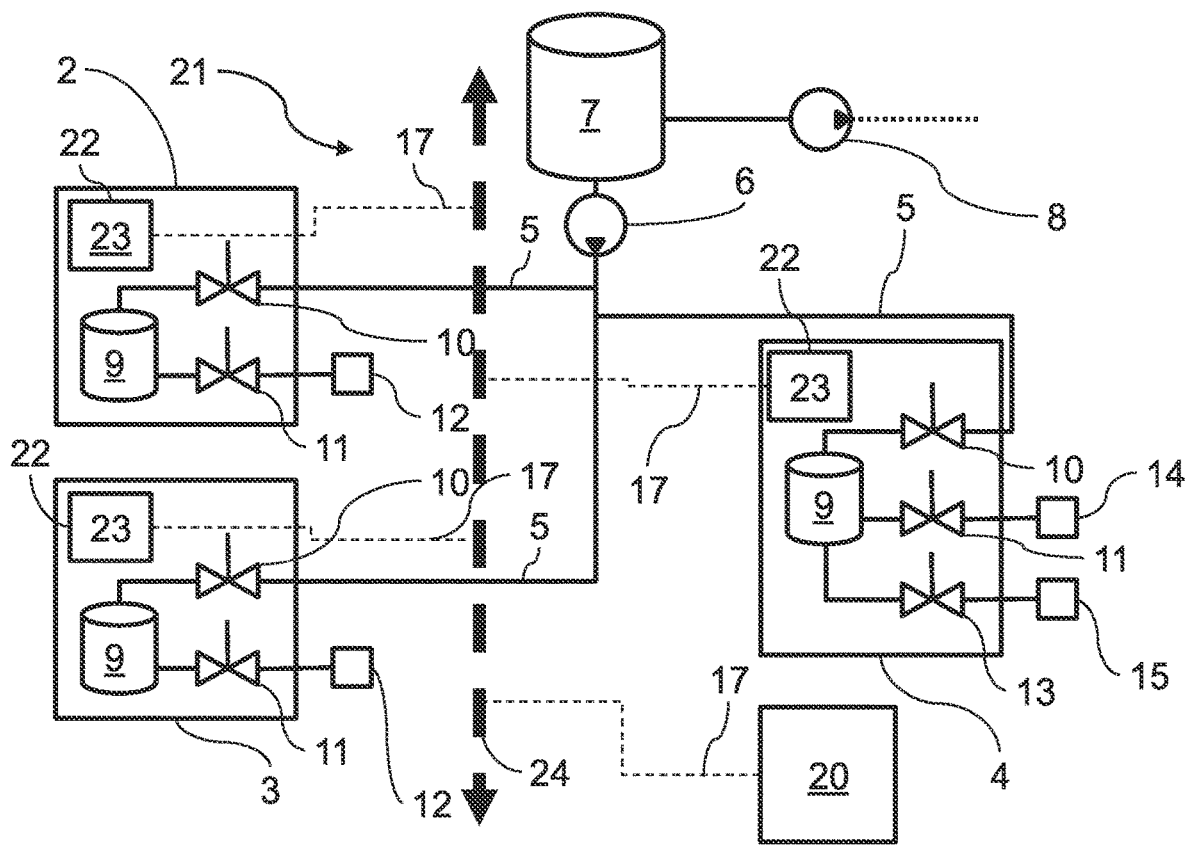
FIG. 2 shows a second example embodiment of a water supply system.

A second example embodiment of a water supply system 21 and a second example embodiment of a method for controlling such a water supply system 21 will be described below with reference to FIG. 2. In FIG. 2, such elements of the water supply system 21 are denoted by the same reference signs as elements of the water supply system 1 with the self-same reference signs from FIG. 1.

In order to leave out unnecessary repetitions, only those aspects of the water supply system 21 that differ from the water supply system 1 are described in more detail. In all other aspects, the water supply system 21 from FIG. 2 corresponds to the water supply system 1 from FIG. 1.

The water supply system 21 from FIG. 2 differs from the water supply system 1 from FIG. 1 in particular in that the control system 22 is not formed by a central data processing unit but by the local data processing units 23 of the individual consumers 2, 3, 4, which therefore constitute decentral control units 23. These decentral control units 23 take on firstly the tasks of the data processing units 16 in FIG. 1, but also secondly the function of the central control unit 18 from FIG. 1.

For this purpose, each of the decentral control units 23 outputs the state parameters of the buffer store 9 of the respective consumer 2, 3, 4 on a data bus 24, on which the flight computer 20 also provides information. The data bus 24 may be wireless or wired. Each of the decentral control units 23 reads the state parameters provided by the other decentral control units 23 on the bus. In this way, all decentral control units 23 have the same information, on the basis of which the control system 22 makes a decision as to at which time each filling valve 10 and each consumer valve 11, 13 is opened and closed again. Since all decentral control units use the same logic, each decentral control unit 23 at any point in time knows which valve 10, 11, 13 is to be opened and can therefore control the opening of the specific valves 10, 11, 13.

This embodiment has the advantage that, in the event of failure of an individual decentral control unit 23, the rest of the control units 23 continue to function. This makes optimum further operation of the individual consumers possible.

Figure 3:
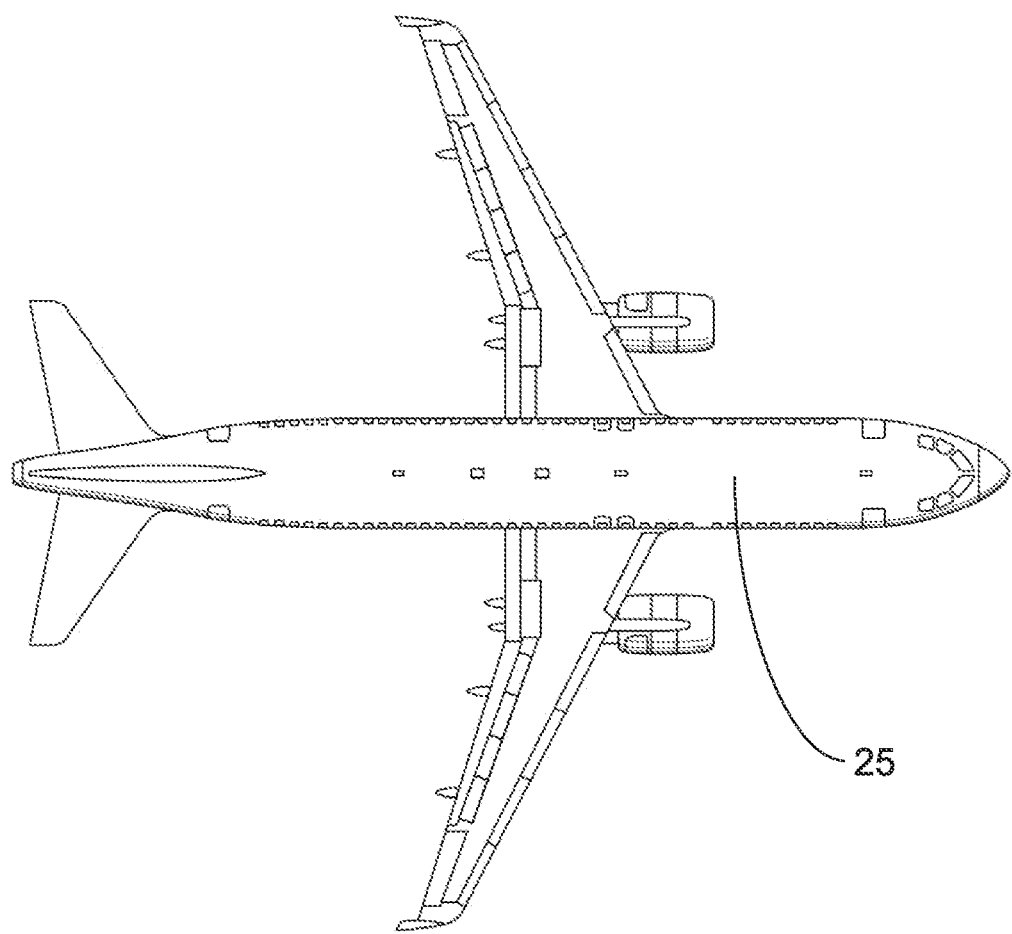
FIG. 3 shows an example embodiment of an aircraft.

Finally, FIG. 3 illustrates an aircraft 25, in which the water supply system in FIG. 1 or FIG. 2 is used.

The subject matter disclosed herein can be implemented with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A water supply system for an aircraft, comprising:
a water tank, a pressure source and a plurality of consumers with buffer stores, wherein the plurality of consumers is connected to the water tank by lines and the pressure source;
each consumer of the plurality of consumers with buffer stores having a buffer store for water, a filling valve and a consumer valve, wherein, in each consumer of the plurality of consumers with buffer stores, the filling valve is between a respective buffer store and the pressure source and is configured such that the respective buffer store can be filled by opening the filling valve, and the consumer valve is configured such that water can be removed from the buffer store by opening the consumer valve;

each consumer with a buffer store being configured to transmit at least one state parameter describing a state of the buffer store of a respective consumer to a control system of the water supply system; and the control system being configured to control opening and closing of the filling valves of the consumers with buffer stores by taking into account the transmitted state parameters such that removal of water from the water tank by the pressure source does not exceed a threshold value at any point in time.

2. The water supply system according to claim 1, wherein the control system is configured to control the opening and closing of the filling valves of consumers with buffer stores connected to the water tank by the pressure source such that at no point in time is more than a predetermined number of filling valves open, wherein the predetermined number is smaller than a number of the plurality of consumers with buffer stores and or is one.

3. The water supply system according to claim 1, wherein the at least one state parameter is selected from the group consisting of a fill state of the buffer store, a pressure of the water in the buffer store, and a request for opening the consumer valve, or wherein the at least one state parameter is a description of the state of the buffer store.

4. The water supply system according to claim 1, wherein the control system is formed by a central control unit, which is configured to control the opening and closing of the filling valves of the consumers with buffer stores, and or wherein the control system comprises a plurality of independent control units, wherein each independent control unit is assigned a consumer with a buffer store, wherein each independent control unit has available to it the state parameters which are transmitted to the control system by the consumers with buffer stores and taking account of which the control system controls the removal of water from the water tank by the pressure source, and wherein each independent control unit is configured to control the filling valve of the consumer to which it is assigned.

5. The water supply system according to claim 1, wherein the control system is configured to control the opening and closing of the consumer valve of at least one consumer.

6. The water supply system according to claim 5, wherein at least one consumer the consumer valve of which can be controlled by the control system is configured to transmit a request for opening the consumer valve to the control system as a state parameter, and wherein the control system is configured to delay a point in time at which the consumer valve is opened until a user requests that the consumer valve is opened, with a result that it is possible to delay the filling of the buffer store.

7. The water supply system according to claim 1, wherein the control system is configured to receive flight data from an aircraft system and to take the received flight data into account when controlling the filling valves of the consumers.

8. The water supply system according to claim 1, wherein the plurality of consumers comprises at least one aircraft toilet with a flush system and or a tap and or at least one tap in a galley.

9. An aircraft comprising a water supply system according to claim 1.

10. A method for controlling a water supply system for an aircraft, having a water tank, a pressure source and a plurality of consumers with buffer stores, wherein the plurality of consumers with buffer stores is connected to the water tank by way of lines and the pressure source, wherein each consumer of the plurality of consumers with buffer stores has a buffer store for water, a filling valve and a consumer valve, wherein, in each consumer of the plurality of consumers with buffer stores, the filling valve is between the respective buffer store and the pressure source and is configured such that the respective buffer store can be filled by opening the filling valve, and the consumer valve is configured such that water can be removed from the buffer store by opening the consumer valve, wherein each consumer with a buffer store transmits at least one state parameter describing a state of the buffer store of the respective consumer to a control system of the water supply system, and wherein the control system controls the opening and closing of the filling valves of the consumers by taking into account the transmitted state parameters such that removal of water from the water tank by the pressure source does not exceed a threshold value at any point in time.

11. The method according to claim 10, wherein the opening and closing of the filling valves of consumers connected to the water tank by the pressure source is controlled such that at no point in time is more than a predetermined number of filling valves open, wherein the predetermined number is smaller than a number of the plurality of consumers with buffer stores and or is one.

12. The method according to claim 10, wherein the at least one state parameter is selected from the group consisting of a fill state of the buffer store, a pressure of the water in the buffer store, and a request for opening the consumer valve, or wherein the at least one state parameter is a description of the state of the buffer store.

13. The method according to claim 10, wherein the control system is formed by a central control unit which controls the opening and closing of the filling valves of the consumers with buffer stores, or wherein the control system comprises a plurality of independent control units wherein each independent control unit is assigned a consumer with a buffer store, wherein each independent control unit has available to it the state parameters which are transmitted to the control system by the consumers and taking account of which the control system controls the removal of water from the water tank by the pressure source, and wherein each independent control unit controls the filling valve of the consumer to which it is assigned.

14. The method according to claim 10, wherein the opening and closing of the consumer valve of at least one consumer of the plurality of consumers with buffer stores is controlled.

15. The method according to claim 14, wherein at least one consumer of the plurality of consumers with buffer stores, the consumer valve of which can be controlled by the control system, transmits a request for opening the consumer valve to the control system as a state parameter, and wherein the control system delays a point in time at which the consumer valve is opened until a user requests that the consumer valve is opened, with a result that it is possible to delay the filling of the buffer store.

* * * * *